US006877276B1

United States Patent
Legunn et al.

(10) Patent No.: US 6,877,276 B1
(45) Date of Patent: Apr. 12, 2005

(54) PLANTER WITH DRAINAGE SPOUT

(75) Inventors: Kenneth Legunn, 6 Chapel Ct., P.O. Box 394, Waccubue, NY (US) 10597; Jeff Legunn, 6 Chapel Ct., P.O. Box 394, Waccubue, NY (US) 10597; Eric Legunn, 6 Chapel Ct., P.O. Box 394, Waccubue, NY (US) 10597

(73) Assignees: Kenneth Legunn, Waccubue, NY (US); Eric Legunn, Waccubue, NY (US); Jeff Legunn, Waccubue, NY (US)

(*) Notice: Subject to any disclaimer, the term of this patent is extended or adjusted under 35 U.S.C. 154(b) by 0 days.

(21) Appl. No.: 10/715,807

(22) Filed: Nov. 17, 2003

(51) Int. Cl.[7] .............................................. A01G 9/02
(52) U.S. Cl. ............................................. 47/65.5; 47/67
(58) Field of Search ................... 47/65.5, 65.6, 47/67, 68, 11, 51, 52, 71, 79, 82, 83

(56) References Cited

U.S. PATENT DOCUMENTS

| | | | |
|---|---|---|---|
| 603,492 A | * 5/1898 | Waterer | 47/65.6 |
| 1,154,627 A | * 9/1915 | Hall | 604/403 |
| 2,019,249 A | * 10/1935 | Bradley | 47/68 |
| 2,948,522 A | * 8/1960 | Peters | 432/263 |
| D240,383 S | 7/1976 | Connell | 47/67 |
| D259,712 S | 6/1981 | Heydenreich | 47/67 |
| 4,332,282 A | 6/1982 | Strange | 141/1 |
| 4,635,394 A | 1/1987 | Brown | 47/67 |
| 4,642,938 A | * 2/1987 | Georges et al. | 47/2 |
| 4,771,573 A | 9/1988 | Stengel | 47/67 |
| 5,052,149 A | 10/1991 | Johnson | 47/67 |
| 5,062,239 A | 11/1991 | Helton | 47/67 |
| 5,088,234 A | 2/1992 | Wong | 47/67 |
| D362,829 S | 10/1995 | Wagner | D11/148 |
| 5,487,517 A | * 1/1996 | Smith | 248/215 |
| 5,502,922 A | * 4/1996 | Shlomo | 47/62 R |
| 6,073,393 A | 6/2000 | Gutsche | 47/67 |
| D432,944 S | 10/2000 | Harris | D11/148 |
| 6,269,589 B1 | * 8/2001 | Bouler | 47/65.5 |

FOREIGN PATENT DOCUMENTS

| | | | | |
|---|---|---|---|---|
| DE | 3331640 A1 | * 3/1985 | ......... | A01G/27/00 |
| JP | 402167016 A | * 6/1990 | ......... | A01G/9/02 |
| JP | 404020216 A | * 1/1992 | ......... | A01G/9/02 |

* cited by examiner

*Primary Examiner*—Son T. Nguyen

(57) ABSTRACT

A planter has a drainage spout that extends downwardly and outwardly to a drain opening horizontally beyond an underlying structure such as a porch railing.

13 Claims, 2 Drawing Sheets

PLANTER WITH DRAINAGE SPOUT

FIELD OF THE INVENTION

This invention relates to hanging planters and other planters positionable over a railing.

BACKGROUND OF THE INVENTION

People often desire to decorate outside patios and decks with hanging potted plants. Typically, a potted plant is hung on an overhead beam or support and therefore is positioned over a portion of the patio or deck, usually over the railing. FIG. 1 shows a conventional planter 1 hanging by a hook 2 from an upper support beam 3 of the deck 4. Because such beams generally run above the railing 5, the planter 1 hangs above the railing 5.

However, when the planter 1 receives more water than the plant can absorb immediately, there can be an overflow in which dirty water spills onto the railing 5. Even conventional planters with drainage structures drain the excess water directly below the planter, either through a drainage pipe or by a spout where the water trickles down the side of the planter. These conventional structures are also unattractive.

There is therefore a need for a visually attractive planter than can avoid the mess generated by conventional planters.

SUMMARY OF THE INVENTION

It is therefore an object of the present invention to provide a planter that avoids the above-described difficulties of the prior art.

It is a further object of the present invention to provide a planter that directs any excess water away from the patio or deck below it.

The above and other objects are achieved by the present invention which, in one embodiment, is directed to a planter comprising an interior cavity surrounded by a side wall and configured to receive a plant therein, the planter being adapted to be positioned over a structure having a horizontal dimension of predetermined length, and a drainage spout in fluid communication with the interior cavity. The drainage spout extends outwardly to a drain opening horizontally beyond the side wall, the drainage spout being dimensioned in proportion to the horizontal dimension of the structure such that when the planter is positioned over the structure, any water exiting the drain opening falls outside of the structure.

In a preferred embodiment, the drainage spout is an extension of a drainage pipe extending through the interior cavity and having a plurality of upwardly-facing holes through which water in the interior cavity may enter the drainage pipe and pass therethrough out of the planter at the drain opening. The drainage pipe is advantageously positioned at an angle to provide quick drainage.

In one aspect, the structure is a railing, the horizontal dimension is the width of the railing, and the planter is adapted to be hung over the railing with the drain opening spaced from the railing in the horizontal direction.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

Figure 1:
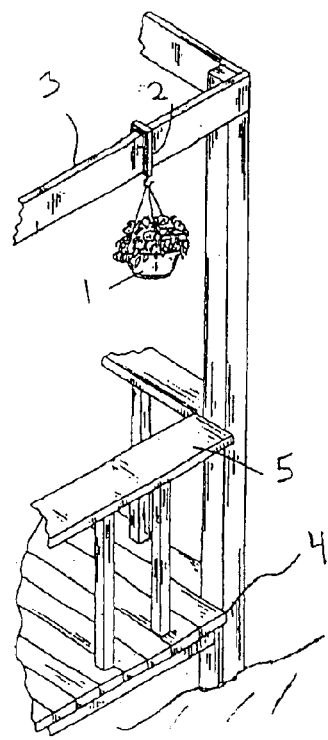
FIG. 1 is an elevational view of a conventional hanging planter.
Figure 2:
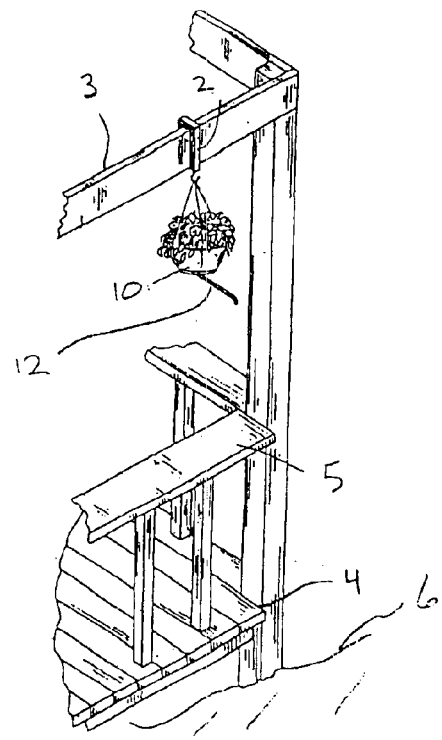
FIG. 2 is an elevational view of a planter in accordance with a first preferred embodiment of the present invention.

FIG. 2 shows a first embodiment of a planter 10 in accordance with the present invention. Like conventional planter 1, planter 10 hangs by a hook 2 from the upper support beam 3 of the deck 4 above the railing 5. Unlike conventional planter 1, planter 10 has a drainage spout 12 that extends at an angle downwardly out to a drain opening 13 to carry any drainage water out beyond the railing 5 to fall on the ground.

Figure 3:
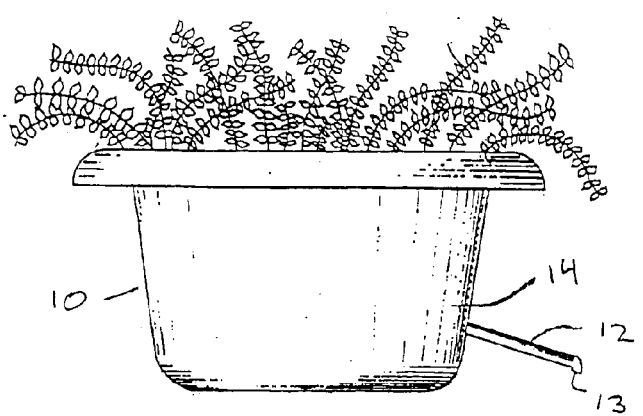
FIG. 3 is a side view of the planter of FIG. 2.

FIG. 3 is a side view of the planter 10. Planter 10 has an outer side wall 14, with the spout 12 extending outwardly and downwardly therefrom.

Figure 4:
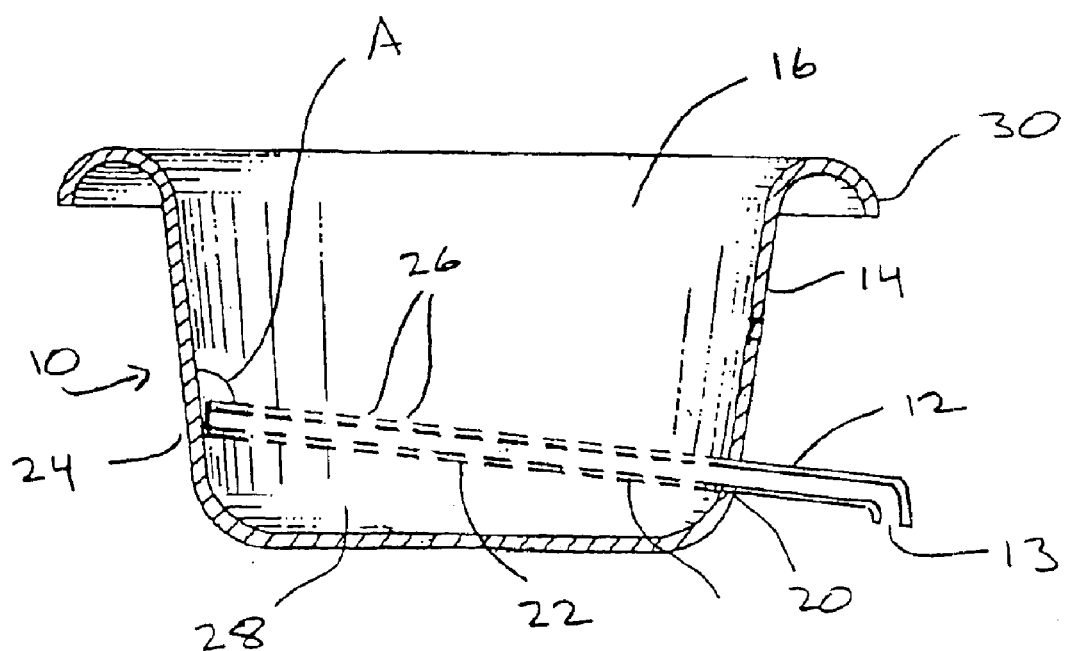
FIG. 4 is a side cross-sectional view of the planter of FIG. 2.

As shown in FIG. 4, the spout 12 is in fluid communication with the interior 16 of the planter 10 and extends through a point 20 on the side wall 14, so any excess water is carried to the side by the length of the horizontal projection of the spout 12 to the drain opening 13. Advantageously the drain opening 13 is positioned at a downturned end 18 of the spout 12 to direct the water down and avoid any trickling back of the water along the length of the spout 12.

In a preferred embodiment, the spout 12 is an extension of a drainage pipe 22 that extends through the interior 16 of the planter 10, advantageously from the point 20 on the side wall 14 to another, diametrically opposed point 24. The pipe 22 includes a number of holes 26 spaced around its surface to receive and discharge water trickling through the soil in the filled planter 10, where the number of holes is determined for a particular application to ensure quick drainage. The lower portion 28 of the interior 16 below the pipe 22 then serves as a reservoir to hold an amount of water at the bottom of the planter.

In order for the collected water to drain out of the pipe 22, the pipe 22 is positioned at an angle A to create a downward slope. This angle A, shown in FIG. 4, is advantageously in the range of 105° to 125°, and particularly advantageously equal to 115°, but any desired angle may be used.

In the embodiment of FIG. 4, the pipe 22 extends along the entire diameter of the planter 10, but it may be shorter in other embodiments.

If desired, a filter or other barrier can be provided in the spout 12 to prevent the earth in the planter 10 from being carried away.

The length of the spout 12 outside of the planter 10 is determined in accordance with the particular environment in which the planter 10 will be placed. Preferably, the spout 12 should be long enough to extend out beyond the side wall 14 and any lip 30 or other extension of the planter 10. Advantageously, planters with a number of spout lengths to accommodate a corresponding number of railing widths can provided.

The spout on any of the embodiments can be made in one piece with the pipe 22 of the planter 10 or it can be removably or permanently attached to the pipe 22. If the spout is removably attached, then a spout of the correct length can be selected for each individual use.

The planter and the pipe/spout can each or both be made of any appropriate material, such as plastic, metal, ceramic and the like.

While the planter in accordance with the present invention has been illustrated as hanging by a hook 2, it will be understood that any hanging structure can be used for hanging the planter from any structure.

In addition, while the planter in accordance with the present invention has been illustrated as hanging over the railing 5, it will be understood that the planter could be positioned on the railing 5 or any other structure, with the spout extending outwardly to direct the excess water to an unexceptional spot.

It will also be understood that the planter in accordance with the present invention can be used to hold a plant in its own body or can be used to hold another pot with the plant inside and a drainage hole or holes.

While the disclosed planters have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A planter comprising:
   an interior cavity surrounded by a side wall and configured to receive a plant therein, said planter being adapted to be positioned over a structure having a horizontal dimension of predetermined length; and
   a drainage spout in fluid communication with said interior cavity, said drainage spout extending outwardly to a drain opening horizontally beyond said side wall, said drainage spout being dimensioned in proportion to the horizontal dimension of the structure such that when said planter is positioned over the structure, any water exiting said drain opening falls outside of the structure,
   wherein said drainage spout is an extension of a drainage pipe extending through said interior cavity, said drainage pipe having a plurality of holes spaced around its surface to receive and discharge therethrough water moving within said interior cavity.

2. The planter of claim 1, wherein said drainage pipe is positioned at an angle to create a downward slope towards said drainage spout.

3. The planter of claim 2, wherein said angle is in the range of 105° to 125°.

4. The planter of claim 3, wherein said angle is substantially equal to 115°.

5. The planter of claim 3, wherein the structure is a railing and the horizontal dimension is the width of the railing, and wherein said planter is adapted to be hung over the railing with said drain opening spaced from the railing in the horizontal direction.

6. The planter of claim 5, wherein said drainage spout extends from said side wall at a lower position on said side wall.

7. The planter of claim 3, wherein said drainage spout is formed integrally with said pipe.

8. The planter of claim 1, wherein the structure is a railing and the horizontal dimension is the width of the railing, and wherein said planter is adapted to be placed on the railing with said drain opening spaced from the railing in the horizontal direction.

9. The planter of claim 8, wherein said drainage spout extends from said side wall at a lower position on said side wall.

10. The planter of claim 1, wherein said planter is at least partly made of plastic.

11. The planter of claim 1, wherein said planter is at least partly made of metal.

12. The planter of claim 1, wherein said planter is at least partly made of ceramic.

13. The planter of claim 1, wherein said drain opening is positioned at a downturned end of said spout to direct the water downwardly.

* * * * *